US012327411B2

(12) United States Patent
Hazeli et al.

(10) Patent No.: US 12,327,411 B2
(45) Date of Patent: Jun. 10, 2025

(54) CONVERTING SPATIAL INFORMATION TO HAPTIC AND AUDITORY FEEDBACK

(71) Applicant: Arizona Board of Regents on Behalf of the University of Arizona, Tucson, AZ (US)

(72) Inventors: Kavan Hazeli, Tucson, AZ (US); Bahram Jalali, Los Angeles, CA (US); Janet Roveda, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 127 days.

(21) Appl. No.: 18/236,842

(22) Filed: Aug. 22, 2023

(65) Prior Publication Data
US 2024/0062548 A1    Feb. 22, 2024

Related U.S. Application Data

(60) Provisional application No. 63/399,901, filed on Aug. 22, 2022.

(51) Int. Cl.
| | |
|---|---|
| *G06V 20/50* | (2022.01) |
| *G01S 17/08* | (2006.01) |
| *G01S 17/86* | (2020.01) |
| *G06V 10/82* | (2022.01) |
| *G08B 7/00* | (2006.01) |

(52) U.S. Cl.
CPC .............. *G06V 20/50* (2022.01); *G01S 17/08* (2013.01); *G01S 17/86* (2020.01); *G06V 10/82* (2022.01); *G08B 7/00* (2013.01)

(58) Field of Classification Search
None
See application file for complete search history.

(56) References Cited

U.S. PATENT DOCUMENTS

2023/0273315 A1* 8/2023 Wen ........................ G01S 17/89
356/28.5
2024/0361141 A1* 10/2024 Amariei ............... G09B 21/007

* cited by examiner

*Primary Examiner* — Samira Monshi
(74) *Attorney, Agent, or Firm* — BLANK ROME LLP

(57) ABSTRACT

A life-assisting system to enhance the quality of life for people with visual impairment. The system integrates state-of-the-art sensing and sensory stimulation with light detection and ranging (LiDAR), machine learning, and advanced haptic navigation to provide the visually impaired population with a real-time haptic map of the three-dimensional environment and auditory descriptions of objects within that environment. By allowing the visually impaired population to sense objects in the surrounding environment through haptic and auditory feedback, the disclosed system has the potential to promote individual independence, reduce anxiety and stress, facilitate access to educational and employment opportunities, and reduce social and economic gaps. To provide those benefits, the system uses multi-modal learning to convert higher dimensional (e.g., four-dimensional) scene data into lower dimensional (e.g., one-dimensional) auditory data and (e.g., two- or three-dimensional) haptic data.

20 Claims, 7 Drawing Sheets

CONVERTING SPATIAL INFORMATION TO HAPTIC AND AUDITORY FEEDBACK

CROSS-REFERENCE TO RELATED APPLICATIONS

This application claims priority to U.S. Prov. Pat. Appl. No. 63/399,901, filed Aug. 22, 2022, which is hereby incorporated by reference in its entirety. This subject matter described herein is also related to the systems described in U.S. Prov. Pat. Appl. No. 63/383,997, filed Nov. 16, 2022, U.S. Prov. Pat. Appl. No. 63/482,345, filed Jan. 31, 2023, and U.S. Prov. Pat. Appl. No. 63/499,073, filed Apr. 28, 2023, which are also incorporated by reference in their entirety.

FEDERAL FUNDING

None

BACKGROUND

For visually impaired individuals, spatial awareness and object recognition in unfamiliar environments can be challenging. Advances in three-dimensional image capture and object detection algorithms raise the possibility of helping visually impaired individuals navigate through the world. However, realizing those benefits requires the conversion of higher dimensional data (e.g., four-dimensional scene data) into lower dimensional information that can be received and understood by a human, object detection algorithms that can accurately detect and describe objects in real time, and hardware specifically designed to convey scene information via non-visual sensory feedback.

SUMMARY

Disclosed is a life-assisting system to enhance the quality of life for people with visual impairment. The system integrates state-of-the-art sensing and sensory stimulation with light detection and ranging (LiDAR), machine learning, and advanced haptic navigation to provide the visually impaired population with a real-time haptic map of the three-dimensional environment and auditory descriptions of objects within that environment. By allowing the visually impaired population to sense objects in the surrounding environment through haptic and auditory feedback, the disclosed system has the potential to promote individual independence, reduce anxiety and stress, facilitate access to educational and employment opportunities, and reduce social and economic gaps. To provide those benefits, the system uses multi-modal learning to convert higher dimensional (e.g., four-dimensional) scene data into lower dimensional (e.g., one-dimensional) auditory data and (e.g., two- or three-dimensional) haptic data.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 1A:
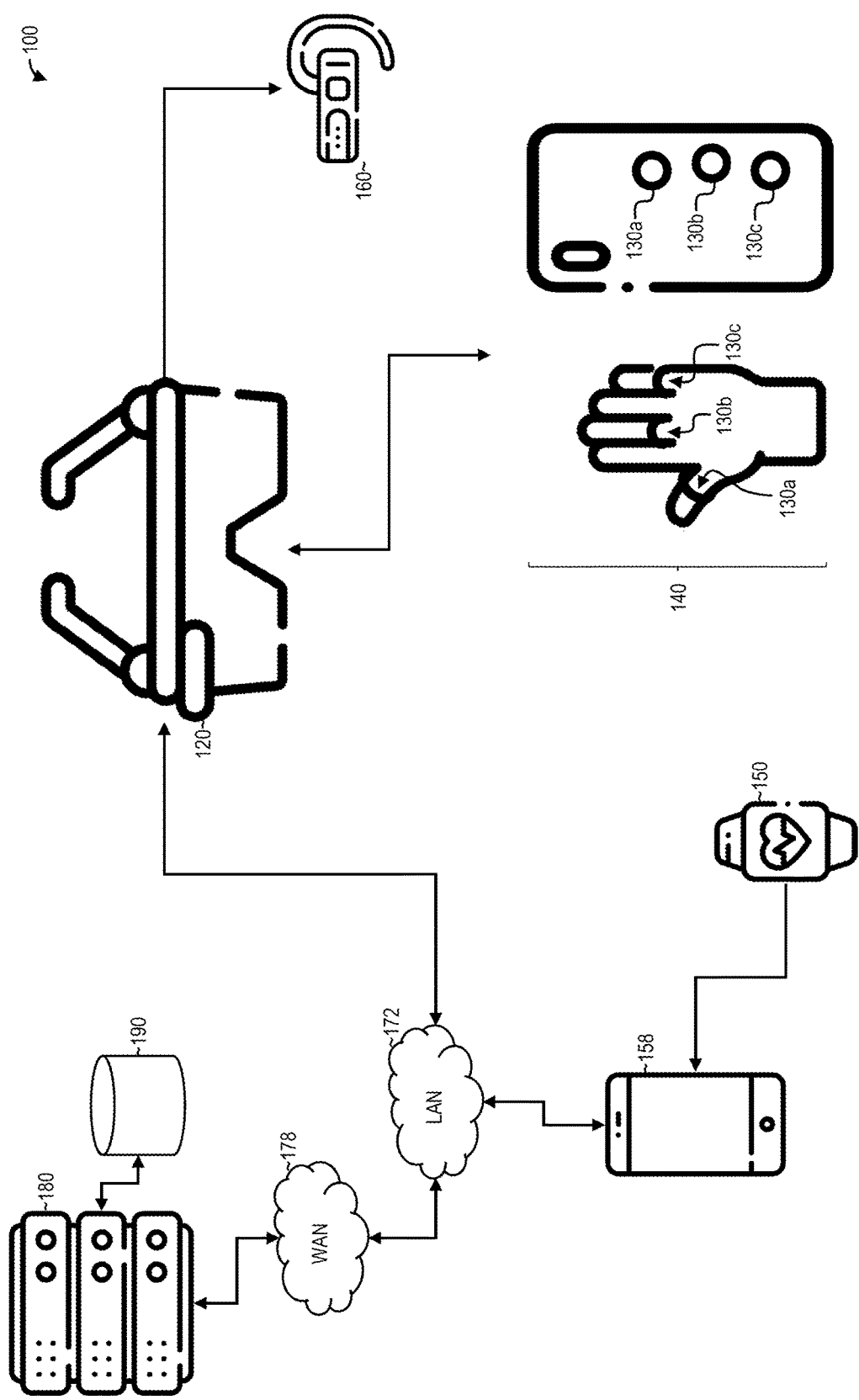
FIG. 1A is a diagram of an architecture of a haptic/auditory feedback system, which includes a wearable three-dimensional image capture system and a haptic feedback system according to exemplary embodiments.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1A is a diagram illustrating an architecture 100 of a haptic/auditory feedback system according to exemplary embodiments.

As shown in FIG. 1A, the architecture 100 includes a haptic feedback system 140, an auditory feedback device 160, and a three-dimensional image capture system 120 that is in communication with a server 180 (that includes or is in communication with a remote storage device 190) via a wide area network 178 (e.g., the internet). In some embodiments, the architecture 100 also includes a wearable health monitoring device 150. The image capture system 120, the haptic feedback system 140, the auditory feedback device 160, and/or the wearable health monitoring device 150 may communicate directly via a wired or wireless connection (e.g., Bluetooth), via a local area network 172, or via communication with a local computing device 158 (e.g., a smartphone).

As described in detail below, the image capture system 120 is configured to capture image data and light detection and ranging (LiDAR) data from the point of view of the user. Accordingly, the image capture system 120 may be a wearable device, for example incorporated into a pair of glasses as shown in FIG. 1A.

The auditory feedback device 160 may be any hardware device capable of receiving audio data and outputting corresponding sounds. For example, the auditory feedback device 160 may be a wireless headset (as shown). Alternatively, the image capture system 120 and the auditory feedback device 160 may be realized as a single device (e.g., glasses that include camera(s) 122, LiDAR scanner(s) 124, and an earpiece that receives sound via a wired connection).

The haptic feedback system 140 includes a number of haptic feedback devices 130 (e.g., three haptic feedback devices 130a, 130b, and 130c). Each haptic feedback device 130 is associated with a direction (e.g., left, ahead, and right). As shown in FIG. 1A, the haptic feedback devices 130 may be wearable (e.g., wearable rings) or attached to or incorporated into another device (e.g., a phone case).

The server 180 may be any hardware computing device capable of and programmed to execute software instructions to perform the functions described herein. The remote storage device 190 may include any non-transitory computer readable storage media. The wearable health monitoring device 150 may be any hardware device that monitors the physiological condition of the user (e.g., a fitness tracker, an activity tracker, a smartwatch, a smart ring, etc.). The wearable health monitoring device, for example, may include a photoplethysmography (PPG) sensor that measures pulse signals, a galvanic skin response sensor that measures skin conductance, a skin temperature sensor, etc., and may monitor those physiological condition(s) over time, for example by deriving average heart rate estimates, estimating heart rate variability, etc.

Figure 1B:
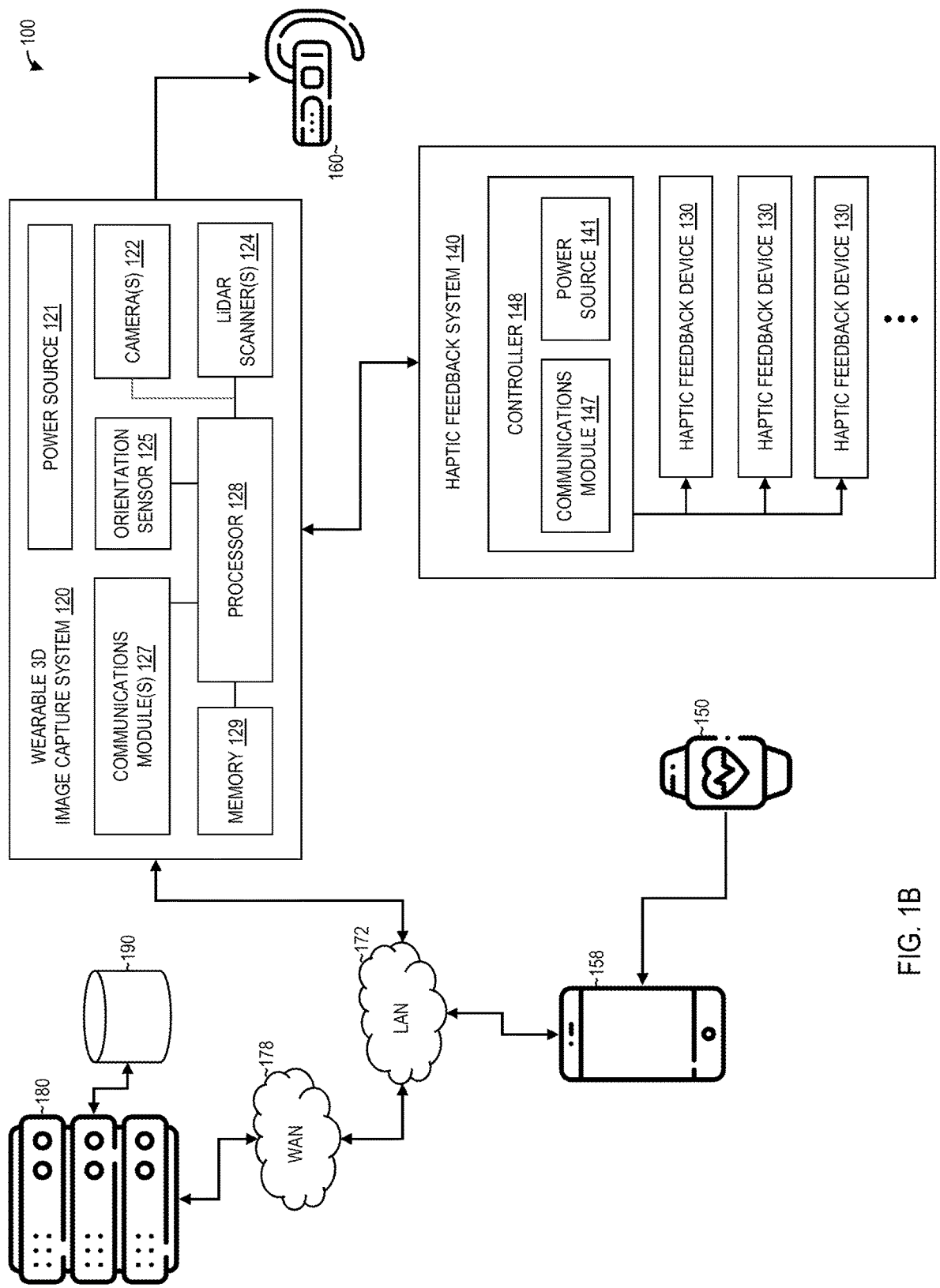
FIG. 1B is a diagram illustrating hardware components of the three-dimensional image capture system and the haptic feedback system according to various exemplary embodiments.
Figure 1C:
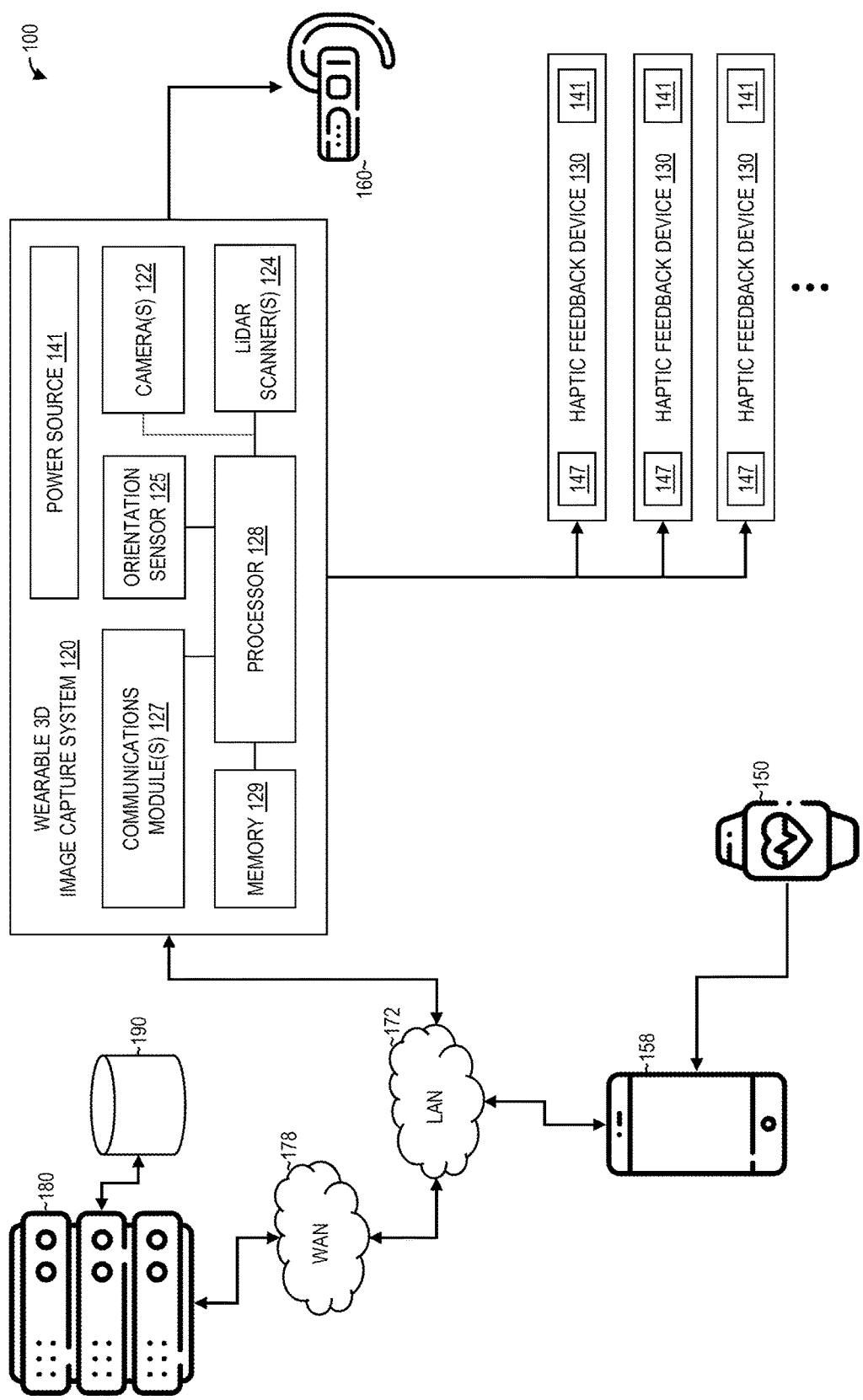
FIG. 1C is a diagram illustrating the haptic feedback system according to other exemplary embodiments.

FIGS. 1B and 1C are diagrams illustrating hardware components of the three-dimensional image capture system 120 and the haptic feedback system 140 according to various exemplary embodiments. In the embodiments of FIGS. 1B and 1C, the three-dimensional image capture system 120 includes a power source 121 (e.g., a rechargeable battery), one or more cameras 122, one or more LiDAR scanners 124, one or more communications modules 127, a hardware computer processor 128, and memory 129. In some embodiments, the image capture system also includes an orientation sensor 125.

The camera(s) 122 may be any optical instrument suitably capable of digitally capturing images via an electronic image sensor and storing those images in the memory 129. The LiDAR scanner(s) 124 may be any device capable of determining ranges by targeting objects and surfaces with light (e.g., ultraviolet light, visible light, near infrared light, micropulse or high energy lasers, etc.) and measuring the time for the reflected light to return to the receiver. The LiDAR scanners 124 may be scanning type, flash LiDAR, etc. To ensure eye safety, the LiDAR scanner(s) 124 may conform to an eye safety standard (e.g., the International Electrotechnical Commission (IEC) class 1 eye safety standard 60825-1:2014). The orientation sensor 125 may be any electronic device that measures and reports the orientation of the image capture system 120 (and, by extension, the orientation of the user). For example, the orientation sensor 125 may include an inertial measurement unit (IMU) and/or a digital compass.

In the embodiment of FIG. 1B, the haptic feedback system 140 includes a controller 148 in wired communication with each haptic feedback device 130. The controller 148 includes a communications module 147 and a power source 141 (e.g., a rechargeable battery). In those embodiments (e.g., the cell phone case example described above), the image capture system 120 may communicate with the controller 148 (via the communications modules 127 and 147), which in turn controls each haptic feedback device 130.

In the embodiment of FIG. 1C, each haptic feedback device 130 includes a communications module 147 and a power source 141 (e.g., a rechargeable battery). In those embodiments (e.g., the wearable ring example described above), the image capture system 120 may communicate with and control each haptic feedback device 130 directly.

The processor 128 of the image capture system 120 and the controller 148 of the haptic feedback system 140 may be any hardware computing component programmed to execute software instructions to perform the functions described herein. The memory 129 may include any non-transitory computer readable storage media. Each communications module 127 or 147 may be any hardware computing device that enables the respective hardware device (i.e., the image capture system 120, the haptic feedback system 140, or a haptic feedback device 130) to communicate with the other hardware devices of the system, for example via a direct wireless connection (e.g., Bluetooth) or via the local area network 174.

Figure 2:
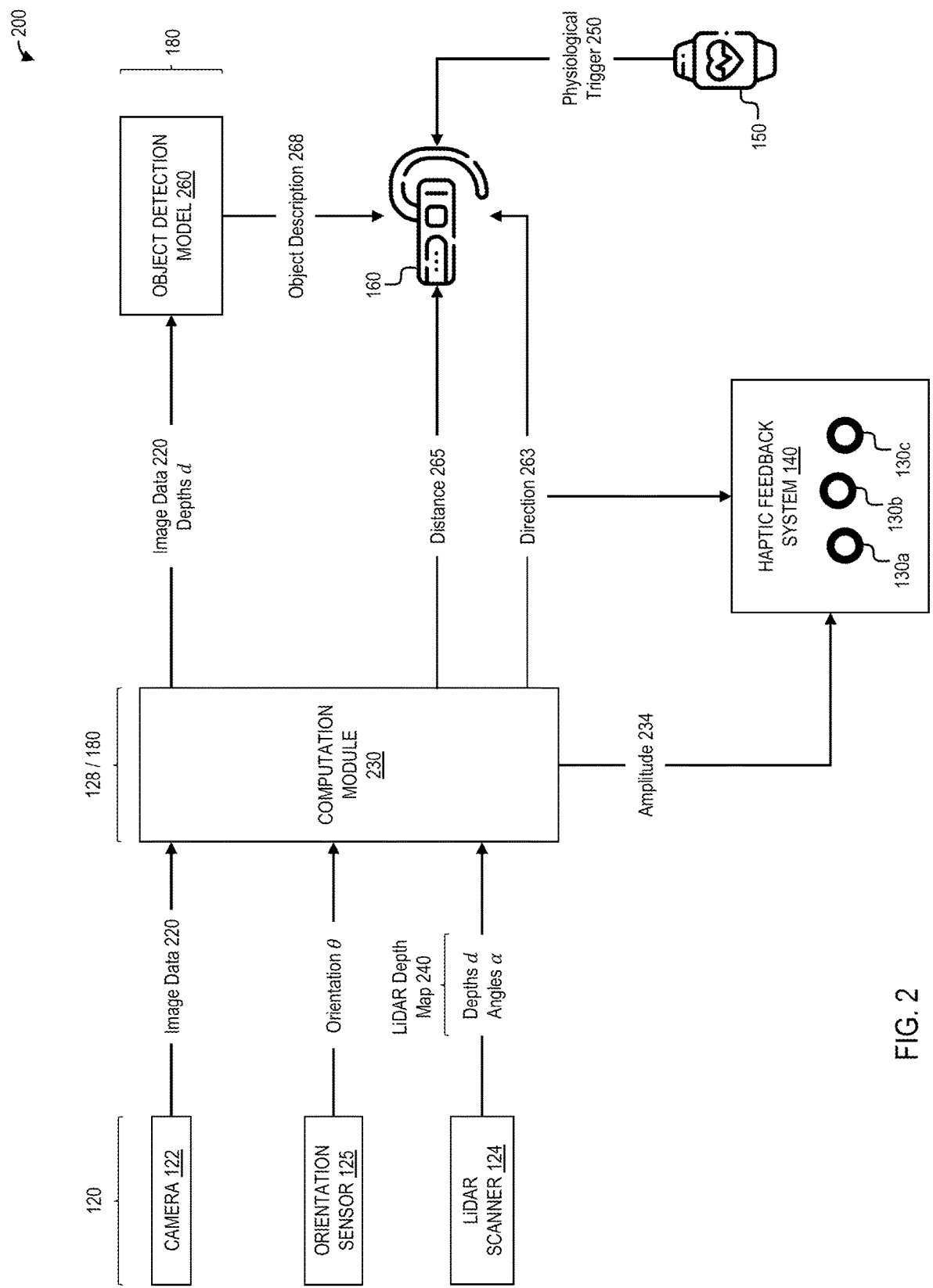
FIG. 2 is a block diagram of the haptic/auditory feedback system according to exemplary embodiments.

FIG. 2 is a block diagram of the haptic/auditory feedback system 200 according to exemplary embodiments. In the embodiment of FIG. 2, the haptic/auditory feedback system 200 includes a computation module 230 and an object detection model 260. The computation module 230 may be realized as software instructions executed by the processor 128 and/or the server 180. As described in detail below, the object detection model 260 may be realized as a machine learning model generated by the server 180 and executed by the server 180, the processor 128, a local computing device 158, etc.

The LiDAR scanner(s) 124 output a LiDAR depth map 240 captured from the environment of the user. As shown in more detail in FIG. 3, the LiDAR depth map 240 includes the depths d of surfaces or objects in the environment and the angles α of those depths d relative to the orientation θ of the user. As described in detail below with reference to FIG. 3, the depth d of each object is converted into an amplitude 234 proportional to the depth d of that object. Meanwhile, the angle α of each object is converted into a direction 263 (e.g., left, ahead, or right). The haptic feedback system 140 then provides haptic feedback, via the haptic feedback device 130 associated with that direction 263, having an amplitude 234 proportional to the depth d of that object (e.g., with a higher amplitude 234 for closer objects).

The camera(s) 122 output image data 220 captured from the environment of the user. As described in detail below with reference to FIG. 4, the object detection model 260 classifies each object in the image data 220 to generate an object description 268. The auditory feedback device 160 then outputs the object description 268 of each object. In some embodiments, the precise depth d of each object is converted into a description of an approximate distance 265 (e.g., in feet, meters, number of steps, etc.) and the auditory feedback device 160 outputs the distance 265 of each object along with the object description 268 of that object. In some embodiments, the auditory feedback device 160 outputs the direction 263 of each object along with the object description 268 of that object. In other embodiments, the auditory feedback device 160 may output the object description 268 of each object as the haptic feedback system 140 simultaneously outputs haptic feedback via the haptic feedback device associated with that direction 263.

In some embodiments, the object detection module 260 may use both the image data 220 and the depth information d from the LiDAR depth map 240 to identify each object. In some embodiments, computation module 230 may only output to the object detection model 260 image data 220 captured in a direction having depth information d indicative of one or more objects.

The goal of the haptic/auditory feedback system 200 is to reduce anxiety and stress among visually impaired users by allowing them to sense objects through haptic and auditory feedback even when in unfamiliar environments. To that end, as described below with reference to FIG. 5, in some embodiments the system 200 may be configured to continually output haptic feedback and output audible object descriptions 268 of detected objects only in a certain mode (for use in unfamiliar environments). Additionally or alternatively, in some embodiments, the haptic/auditory feedback system 200 may provide auditory feedback in response to a physiological trigger 250 output by a wearable health monitoring device 150. In those embodiments, for instance, the system 200 may be configured to output audible descriptions 268 of detected objects in response to data indicating that a physiological metric indicative of the stress level of the user (e.g., heart rate, skin temperature, skin conductance, blood pressure, etc.) exceeds a predetermined threshold.

Figure 3:
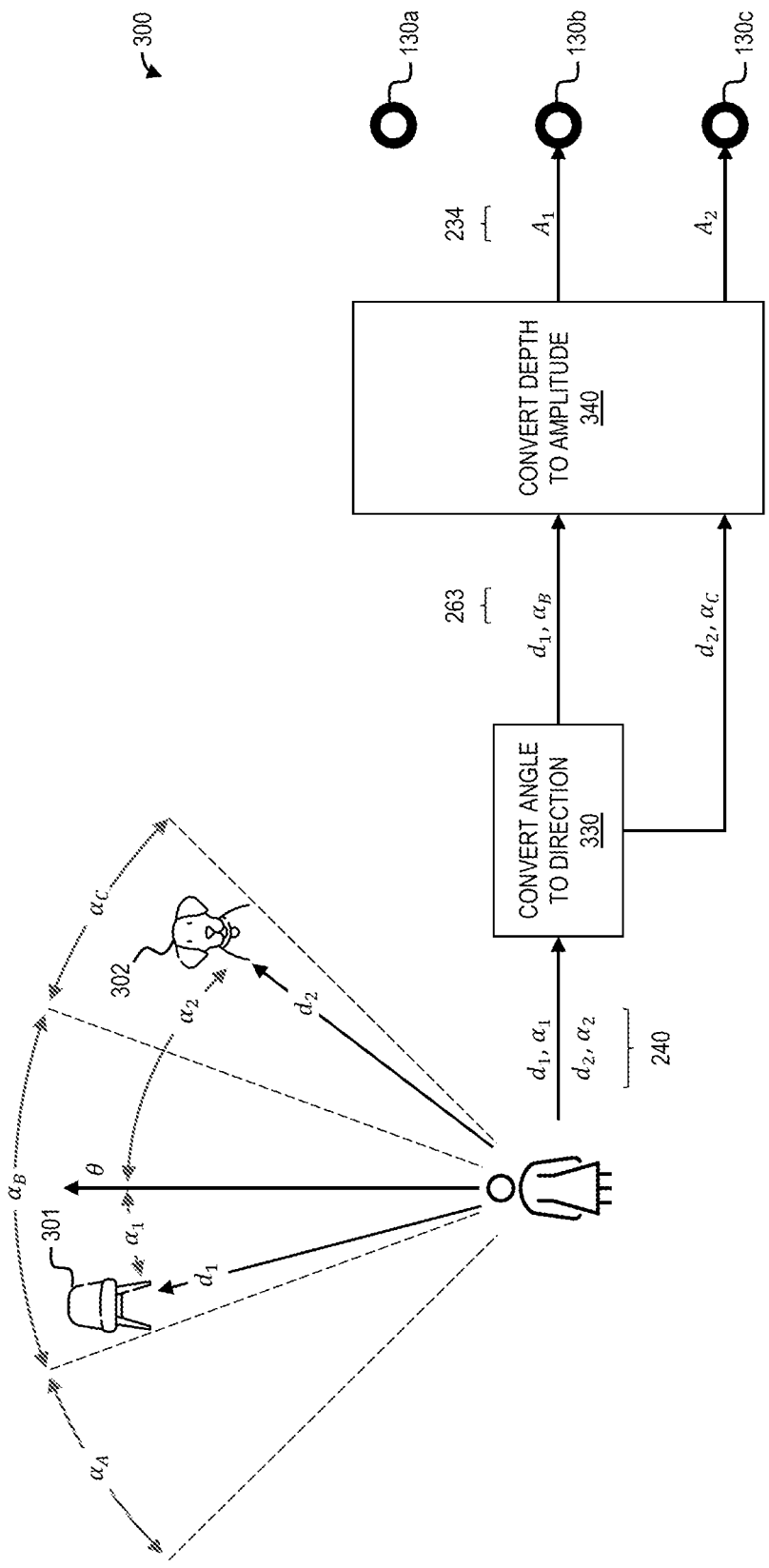
FIG. 3 includes an example light detection and ranging (LiDAR) depth map and a flowchart illustrating a haptic feedback generation process according to an exemplary embodiment.

FIG. 3 includes a diagram of an example LiDAR depth map 240 and a flowchart illustrating a haptic feedback generation process 300 according to an exemplary embodiment.

As described above, the LiDAR depth map 240 includes the depths d of each surface or object and the angles a of each of those depths relative to the orientation θ of the image capture system 120. The example environment of FIG. 3, for instance, includes a chair 301 at depth $d_1$ and angle $a_1$ and a dog 302 at depth $d_2$ and angle $a_2$. As described above, each haptic feedback device 130 is associated with a direction (e.g., left, ahead, and right). To that end, each haptic feedback device 130 may be associated with a range of angles. In the embodiment of FIG. 3, for instance, the haptic feedback device 130a is associated with the angle range $a_A$, the haptic feedback device 130b is associated with the angle range $a_B$, and the haptic feedback device 130c is associated with the angle range $a_C$.

The angle a of each object is converted to a direction 263 in step 330, for example by determining whether the angle a of the object is within an angle range of one of the haptic feedback devices 130. In the example of FIG. 3, for instance, the chair 301 at depth $d_1$ is within the angle range $a_B$ of the haptic feedback device 130b (i.e., the direction 263 of the chair 301 is "ahead") and the dog 302 at depth $d_2$ is within the angle range $a_C$ of the haptic feedback device 130c (i.e., the direction 263 of the dog 302 is "right").

The depth d of each object is converted to an amplitude 234 in step 340. In the example of FIG. 3, for instance, haptic feedback having an amplitude $A_1$ is provided by the haptic feedback device 130b to indicate the depth $d_1$ of the chair 301 and haptic feedback having an amplitude $A_2$ is provided by the haptic feedback device 130c to indicate the depth $d_2$ of the dog 302. The depth d of each object may be converted to the corresponding amplitude 234 using a formula, a look-up table, etc. The amplitude 234 may be inversely proportional to the depth d so that haptic feedback having a larger amplitude is provided when objects are closer.

In some embodiments, the image capture system 120 may include an orientation sensor 125 that monitors the real-time orientation θ of the user as described above. In those embodiments, if the user turns his or her head (or entire body), the system 200 can rotate the LiDAR depth map 240 to reflect the angle θ of each depth d relative to the real-time orientation θ of the user (for example, at a sampling rate that is higher than the sampling rate of the LiDAR scanner(s) 124). In other embodiments, the image capture system 120 may include an IMU that monitors the real-time location of the user as described above. In those embodiments, as the user moves, the system 200 can translate the LiDAR depth map 240 to reflect the depths d of each object relative to the real-time location of the user (for example, at a sampling rate that is higher than the sampling rate of the LiDAR scanner(s) 124).

Figure 4:
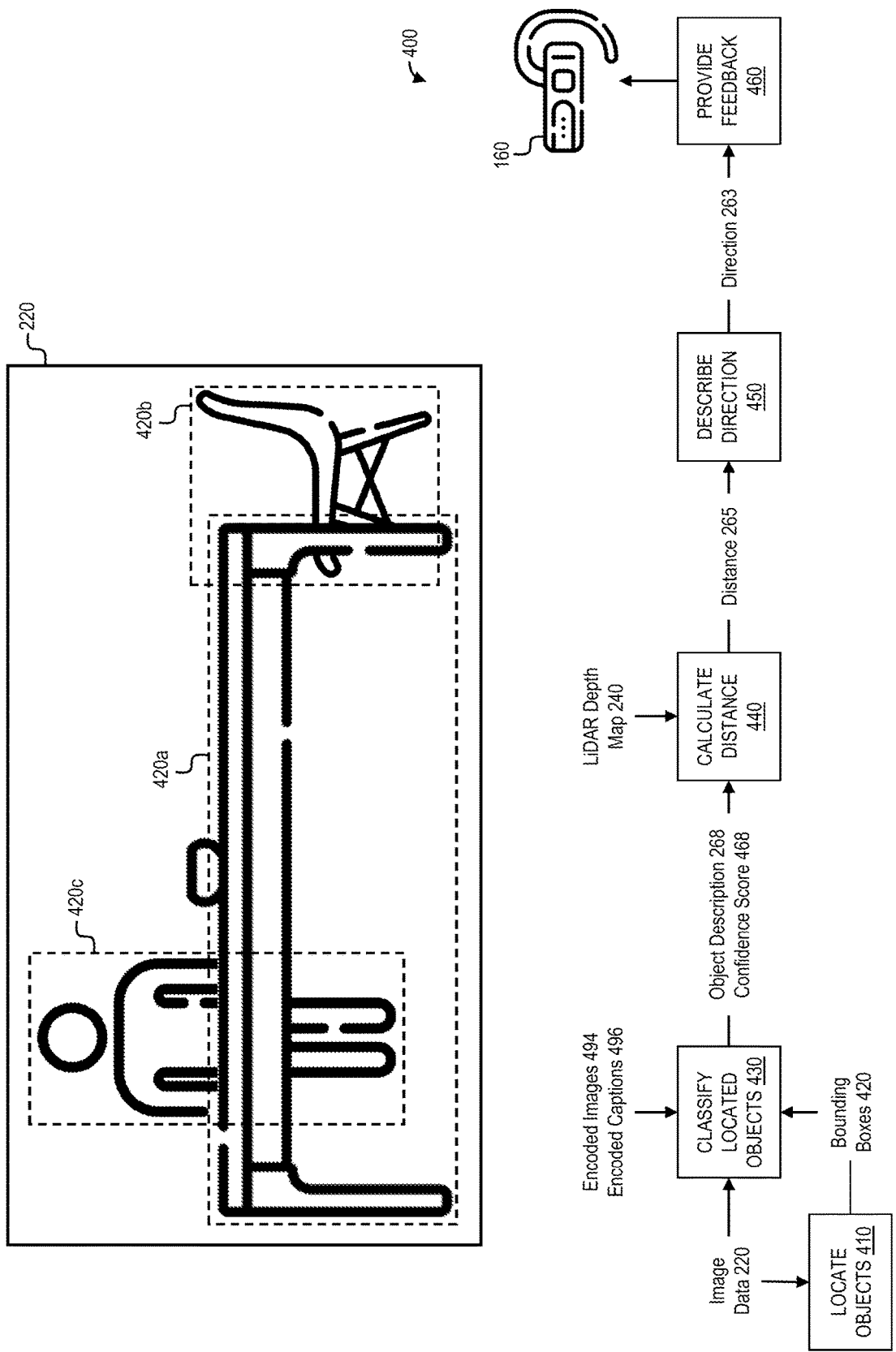
FIG. 4 includes example image data and a flowchart illustrating an auditory feedback generation process according to an exemplary embodiment.

FIG. 4 includes example image data 220 and a flowchart illustrating an auditory feedback generation process 400 according to an exemplary embodiment.

As shown in FIG. 4, the object detection model 260 uses bounding boxes 420 to identify objects in step 410 (e.g., the bounding boxes 420a, 420b, and 420c in the example image data 220).

In step 430, the object detection model 260 uses a dataset of encoded images 494 and encoded captions 496 (stored, for example, in the remote storage device 190) to classify the object within each bounding box 420. As a result, the object detection model 260 generates the object descriptions 268 described above for each object within each bounding box 420 along with a confidence score 468 indicative of the confidence that the object description 268 is accurate. In step 440, the precise depth d of each object (as indicated by the LiDAR depth map 240) is converted into a description of an approximate distance 265 (e.g., in feet, meters, number of steps). In step 450, an audio description of the direction 263 of each object (e.g., left, ahead, or right) is generated. The auditory feedback is provided via the audio feedback device 160 in step 460.

To generate highly accurate object description 268 with real-time speed, the object detection model 260 may be a one-stage YOLO (You Only Look Once) object detection model that processes an entire image in a single forward pass of a convolutional neural network (CNN). The YOLO object detection model may be implemented using the Open Source Computer Vision (OpenCV) library of programming functions for real-time computer vision. By processing the entire image data 220 in a single pass (unlike two-stage detection models, such as R-CNN, that first propose regions of interest and then classify those regions), YOLO object detection models are faster and more efficient.

The object detection model 260 may be trained using an existing dataset of encoded images 494 and encoded captions 496, such as Common Objects in Context (COCO). Additionally, the object detection model 260 may be trained on dataset of additional encoded images 494 and encoded captions 496 of objects that are particularly useful for describing the environment to visually impaired users.

In some embodiments, the object detection model 260 may be a generative model that uses contrastive language-image pre-training (CLIP)—a deep neural network that learns visual concepts from natural language supervision and can be used to generate natural language based on visual concepts. CLIP includes two encoders: an image encoder that encodes an image to identify an image embedding (encoded images 494) and a text encoder that encodes text to identify a text embedding (encoded captions 496). To train CLIP models to classify images, the text paired with images found across the internet has been used to train those CLIP models to predict which text snippet was paired with each image. CLIP can also be used to generate a caption corresponding to a given image. For example, a CLIP-based model can be trained to take an input image and identify (e.g., by performing a latent space search using a genetic algorithm) a caption with a text embedding that is most similar to the image embedding of the input image.

In some embodiments, a separate feature extraction model (e.g., a convolutional neural network) identifies features in the image data 220 (and, in some embodiments, the LiDAR depth map 240) and outputs latent representations of the objects in the environment of the user, which are classified by the generative model. To improve the latency and accuracy of object detection, and to minimize or avoid artificial features or artifacts on the audio and haptic feedback that were not in the actual image (but may be produced a neural network), the system may use the PhyCV (Physics-inspired Computational Imaging) library.

Figure 5:
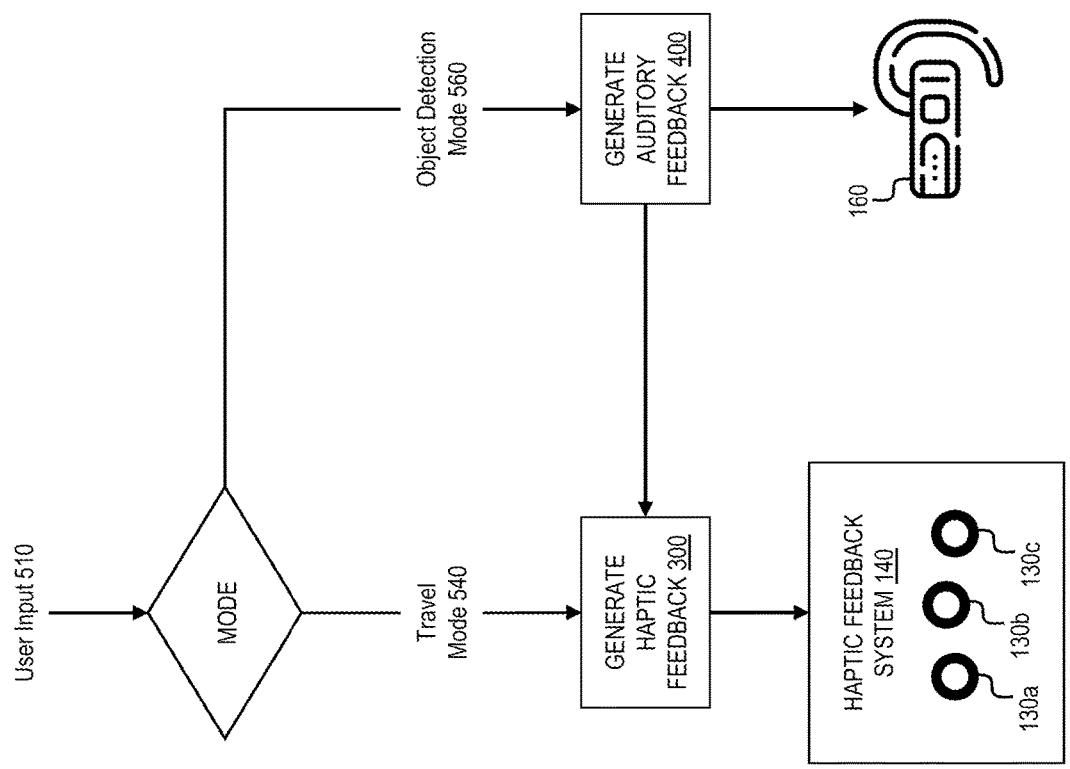
FIG. 5 is a flowchart illustrating a travel mode and an object detection mode according to an exemplary embodiment.

FIG. 5 is a flowchart illustrating a travel mode 540 and an object detection mode 560 according to an exemplary embodiment.

As briefly mentioned above, in some embodiments the haptic/auditory feedback system 200 may be configured to continually output haptic feedback and output audible object descriptions 268 of detected objects only in a certain mode (for use in unfamiliar environments). Accordingly, in those embodiments, the system 200 receives user input 510 (e.g., via a switch) indicative of whether to enter travel mode 540 or object detection mode 560. In travel mode 540, haptic feedback is generated (for example, using the haptic feedback generation process 300 described above with reference to FIG. 3) and output via the haptic feedback system 140. In object detection mode 560, the auditory feedback is generated (for example, using the auditory feedback generation process 400 described above with reference to FIG. 4) and output via the auditory feedback system 160 and haptic feedback is generated (for example, using the haptic feedback generation process 300 described above with reference to FIG. 3) and output via the haptic feedback system 140.

While preferred embodiments have been described above, those skilled in the art who have reviewed the present disclosure will readily appreciate that other embodiments can be realized within the scope of the invention. Accordingly, the present invention should be construed as limited only by any appended claims.

What is claimed is:

1. A system for sensing objects in an environment and outputting haptic and auditory feedback indicative of the distance and direction of those objects, the system comprising:
   a wearable image capture system comprising:
      one or more light detection and ranging (LiDAR) scanners that sense the depths of objects in the environment and the angles of those depths relative to an angle of orientation of the wearable image capture system; and
      one or more cameras that capture image data of the environment;
   a neural network trained to detect objects in the image data and generate an object description of each detected object;
   a haptic feedback system comprising a haptic feedback device associated with each of a plurality of directions, each direction associated with an angle range relative to the angle of orientation of the wearable image capture system;
   a hardware computer processor that:
      identifies the direction of the object by comparing the angle of the object to the angle ranges associated with each of the plurality of directions; and
      outputs haptic feedback via the haptic feedback device associated with the direction of the object; and
   an auditory feedback device that outputs the object description of each detected object.

2. A system for sensing objects in an environment and outputting feedback indicative of the distance and direction of those objects, the system comprising:
   a wearable image capture system comprising one or more light detection and ranging (LiDAR) scanners that sense the depths of objects in the environment and the angles of those depths relative to an angle of orientation of the wearable image capture system;
   a hardware computer processor; and
   a haptic feedback system that outputs haptic feedback indicative of the depths of the objects in the environment and the angles of those depths relative to the angle of orientation of the wearable image capture system.

3. The system of claim 2, wherein:
   the haptic feedback system comprises a haptic feedback device associated with each of a plurality of directions, each direction associated with an angle range relative to the angle of orientation of the wearable image capture system; and
   the hardware computer processor outputs haptic feedback indicative of the angle of each object by:
      identifying the direction of the object by comparing the angle of the object to the angle ranges associated with each of the plurality of directions; and
      outputting haptic feedback via the haptic feedback device associated with the direction of the object.

4. The system of claim 3, wherein, for each of one or more objects in the environment, the hardware computer processor:
   converts the depth of the object to a corresponding amplitude; and
   outputs haptic feedback indicative of the depth of the object by outputting haptic feedback having the amplitude corresponding to the depth of the object.

5. The system of claim 3, wherein each haptic feedback device is wearable.

6. The system of claim 2, further comprising:
   one or more cameras that output image data captured in the environment;
   a neural network trained to detect objects in the image data and generate an object description of each detected object; and
   an auditory feedback device that outputs the object description of each detected object.

7. The system of 6, wherein the auditory feedback device further outputs the direction of the object.

8. The system of 6, wherein the auditory feedback device further outputs information indicative of the depth of the object.

9. The system of 6, wherein the image detection model is a single-stage convolutional neural network.

10. The system of claim 6, wherein:
    the one or more LiDAR scanners output LiDAR data that includes depth information; and
    the image detection model is trained to detect objects in the environment using both the image data and the depth information.

11. A method for sensing objects in an environment and outputting feedback indicative of the distance and direction of those objects, the method comprising:
    sensing, by one or more light detection and ranging (LiDAR) scanners of a wearable image capture system comprising, depths of objects in the environment and the angles of those depths relative to an angle of orientation of the wearable image capture system; and
    outputting haptic feedback indicative of the depths of the objects in the environment and the angles of those depths relative to the angle of orientation of the wearable image capture system.

12. The method of claim 11, wherein:
    the haptic feedback system comprises a haptic feedback device associated with each of a plurality of directions, each direction associated with an angle range relative to the angle of orientation of the wearable image capture system; and
    outputting haptic feedback indicative of the angle of each object comprises:

identifying the direction of the object by comparing the angle of the object to the angle ranges associated with each of the plurality of directions; and outputting haptic feedback via the haptic feedback device associated with the direction of the object.

13. The method of claim 12, wherein outputting haptic feedback indicative of the depth of each object comprises:

converting the depth of the object to a corresponding amplitude; and outputting haptic feedback having the amplitude corresponding to the depth of the object.

14. The method of claim 12, wherein each haptic feedback device is wearable.

15. The method of claim 11, further comprising:

one or more cameras that output image data captured in the environment;

a neural network trained to detect objects in the image data and generate an object description of each detected object; and an auditory feedback device that outputs the object description of each detected object.

16. The system of 15, further comprising:

outputting the direction of the object via the auditory feedback device.

17. The system of 15, further comprising:

outputting information indicative of the depth of the object via the auditory feedback device.

18. The system of 15, wherein the image detection model is a single-stage convolutional neural network.

19. The system of claim 15, wherein:

the one or more LiDAR scanners output LiDAR data that includes depth information; and the image detection model is trained to detect objects in the environment using both the image data and the depth information.

20. The method of claim 15, further comprising:

outputting the haptic feedback in both a travel mode and an image recognition mode; and outputting the object descriptions of each detected object only in the image recognition mode.

* * * * *